United States Patent [19]

Hoffman

[11] Patent Number: 5,010,323
[45] Date of Patent: Apr. 23, 1991

[54] INTERACTIVE OVERLAY DRIVEN COMPUTER DISPLAY SYSTEM

[76] Inventor: Clifford J. Hoffman, 120 Spirea Dr., Dayton, Ohio 45419

[21] Appl. No.: 191,379

[22] Filed: May 9, 1988

[51] Int. Cl.$^5$ ............................................. G09G 5/00
[52] U.S. Cl. ..................................... 340/706; 340/712
[58] Field of Search ...................... 340/706, 711, 712; 178/18, 19; 341/22

[56] References Cited

U.S. PATENT DOCUMENTS

| | | | |
|---|---|---|---|
| 4,442,317 | 4/1984 | Jandrell | 178/18 |
| 4,710,758 | 12/1987 | Mussler et al. | 340/712 |
| 4,716,542 | 12/1987 | Peltz et al. | 340/712 |

Primary Examiner—Alvin E. Oberley
Assistant Examiner—Richard Hjerpe
Attorney, Agent, or Firm—Edward Dugas

[57] ABSTRACT

An overlay driven display system incorporating a digitizer tablet and a stylus for providing coordinate signals to a computer which signals are representative of the coordinates of any point on the tablet selected by the position of the stylus on the tablet. The computer is coupled to a display device, such as a CRT, for displaying addressed data, such as graphic information. An overlay, randomly positionable on the digitizer tablet, contains areas relating to the position of tablet coordinate signals that correspond to the addresses of the data stored in the computer. Three triangularly positioned points on the overlay identify a unique triangle which relates the overlay to the unique angular relationship of the computer file. Software is provided for translating the overlay points to the coordinate system of the digitizer tablet and for scaling the points to match the coordinate system of the digitizer tablet such that the file corresponding to the overlay is accessed and areas on the overlay, when selected by the angular relationship of the points on the stylus, are displayed on the CRT. Overlapping of overlays is permitted to allow the simultaneous display of a plurality of files. The system also permits other than three points to be used.

21 Claims, 6 Drawing Sheets

INTERACTIVE OVERLAY DRIVEN COMPUTER DISPLAY SYSTEM

TECHNICAL FIELD

The present invention relates generally to keyboards for data inputting to computer displays and more particularly to a keyboard system, activated by means of overlays, and operated in conjunction with a digitizer tablet and stylus, and a computer with a display.

BACKGROUND OF THE INVENTION

A portion of the disclosure of this patent document contains material to which a claim of copyright protection is made. The copyright owner has no objection to the facsimile reproduction of any one of the patent documents or the patent disclosure, as it appears in the U. S. Patent and Trademark Office patent file or records, but reserves all other rights whatsoever.

Digitizer tablets are used to provide input signals to digital computers. A surface of the tablet is sensitized to the position of a stylus. The stylus is electrically or optically coupled to the digitizer tablet and causes a coordinate signal to be generated which signal corresponds to the coordinates of the point at which the stylus is positioned on the surface of the tablet. The generated coordinate signal is then used by the computer in real-time to select menu items from a keyboard selected and displayed menu. The stylus is generally activated by pressing it against the tablet surface. A paper overlay having defined function areas, or other file information relating to the keyboard selected menu, is positioned on the tablet surface and aligned with the X,Y coordinate axes of the tablet to facilitate the users positioning of the stylus on the tablet. The orientation of the overlay on the surface of the tablet and the scale of the overlay must be such that the position of the stylus on the overlay corresponds to the point on the tablet that will generate the correct coordinate signals for addressing the correct computer file. Misalignments will result in either addressing the wrong file, or no file at all. It would therefore be highly desirable to have a system that is not critical with respect to overlay size and position and which does not require a preidentification of the overlay description file. The present invention is such a system.

SUMMARY OF THE INVENTION

In accordance with the present invention there is provided a system wherein the overlay may be positioned on the tablet surface with any orientation as the system automatically transforms the position of the overlay to the coordinate axes of the overlay description file (ODF)and in addition the overlay is provided with scaling information for automatically normalizing the size of the overlay to the dimensions contained in the ODF. Moreover, triangularly arranged points on the overlay define a unique angular relationship corresponding to the address of a stored file, enable the associated Overlay Description File (ODF) to be identified without prior knowledge or specification of the ODF.

The one preferred embodiment of the invention utilizes an overlay having three points that are positioned at the vertices of a triangle with a unique angular relationship such that the position of a point at one vertex is defined as a base point, at a second vertex a scale point and at a third vertex a file point. The system transforms the base point, the scale point, and the file point to an Overlay Management Space (OMS) which identifies the particular ODF. The distance between the base point and the scale point on the tablet represents the scale of the overlay which is transformed to a predetermined distance represented in the ODF. Further positioning of the stylus, at selected areas on the overlay, will address and display data from the accessed file. The software used with the present system permits the use of multiple overlays to access multiple files.

Other embodiments of the invention utilize two and four points for identification of a file.

Three methods are disclosed for entering the triangle vertex points. The first requires that the points be entered in a fixed sequence, for example, point 1, point 2, and then point 3, the second permits the three points to be entered in either a clockwise or a counter clockwise sequence, starting at any one of the three points and the third permits the three points to be entered in a random order.

A control overlay may also be used with the aforementioned system which overlay contains areas identifying selected tablet points that will, when selected by the stylus, generate input signals to the computer to permit the user to further interface with the computer to select control functions such as RESET, ADD or DELETE.

The present system also provides for the generation of a unique coordinate, selectively corresponding to a cell size of one, two, three or more units on a side such that the stylus being positioned anywhere within the selected cell size will generate the same coordinate signal that would have been produced if the cell size corresponded to a unit square. Increased cell size is used where accuracy of the stylus positioning is not necessary and where the dedication of cells to a single address does not materially affect the quantity of cells needed for file address.

From the foregoing, it can be seen that it is a principal object of the present invention to provide an improved interactive computer display system.

It is another object of the present invention to provide a system for selecting computer files by the use of a randomly positioned digitizer tablet overlay.

It is yet another object of the present invention to provide a system for selecting computer files and data stored therein for display by means of digitizer tablet overlays.

It is a further object of the present invention to provide a system for selecting computer files and data stored therein for display by means of digitizer tablet overlays which overlays may overlap each other.

It is still another object of the present invention to provide an interactive computer system which may be activated by utilization of different size overlays randomly orientated on an associated digitizer tablet.

These and other objects of the present invention will become more apparent and better understood when taken in conjunction with the following description and the accompanying drawings, throughout which like characters indicate like parts and which drawings form a part of the present specification.

DESCRIPTION OF THE PREFERRED EMBODIMENT

Figure 1:
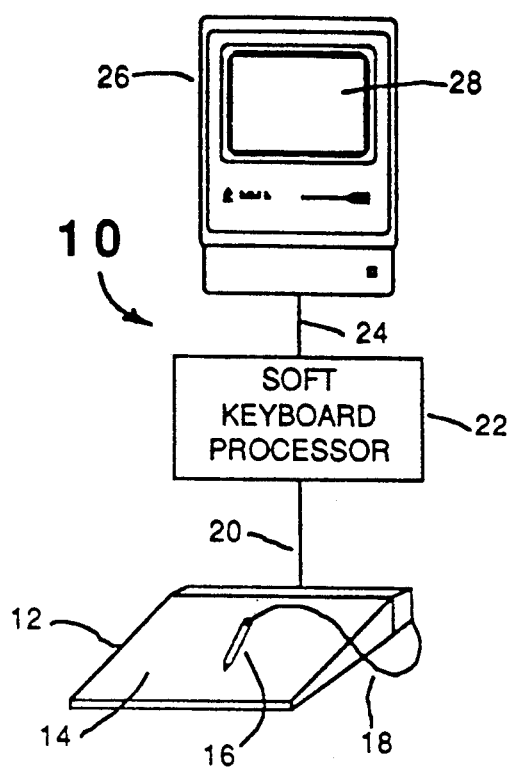
FIG. 1 is a block diagram, partially in perspective, of a computer system coupled to a digitizer tablet.

Referring to FIG. 1, the present system 10 is comprised of a graphics digitizer tablet 12 (e.g. Scriptel SPD-1212) having a surface 14 and a stylus 16, coupled by means of a flexible cable 18, to the digitizer tablet. The digitizer tablet senses the position of the stylus 16 when it is placed on the surface 14 and produces a data stream of X,Y coordinate signals corresponding to the position of the stylus.

The coordinate signals are coupled to a soft keyboard processor 22 over a cable 20. The keyboard processor performs the transformation of overlay coordinate signals in a manner to be described later. The transformed coordinate signals are applied to a computer 26 by means of a cable 24. The computer 26 may be a personal computer of the type that contains an integrated display device 28 such as a CRT. In the preferred embodiment of the invention the computer 26 is an APPLE MACINTOSH For other types of computer systems the display device may be a peripheral unit that is electrically coupled to the computer. It will be obvious to those persons skilled in the art that the soft keyboard processor function may be assumed by the computer or by the digitizer tablet's electronics, if the logic and memory capacity is adequate. The X,Y coordinate signals are inputted to the computer in real-time where they are converted to graphic information, or alternatively, used for functional control of the computer or an application program running on the computer. This latter use for control is frequently called menu-picking.

Figure 2:
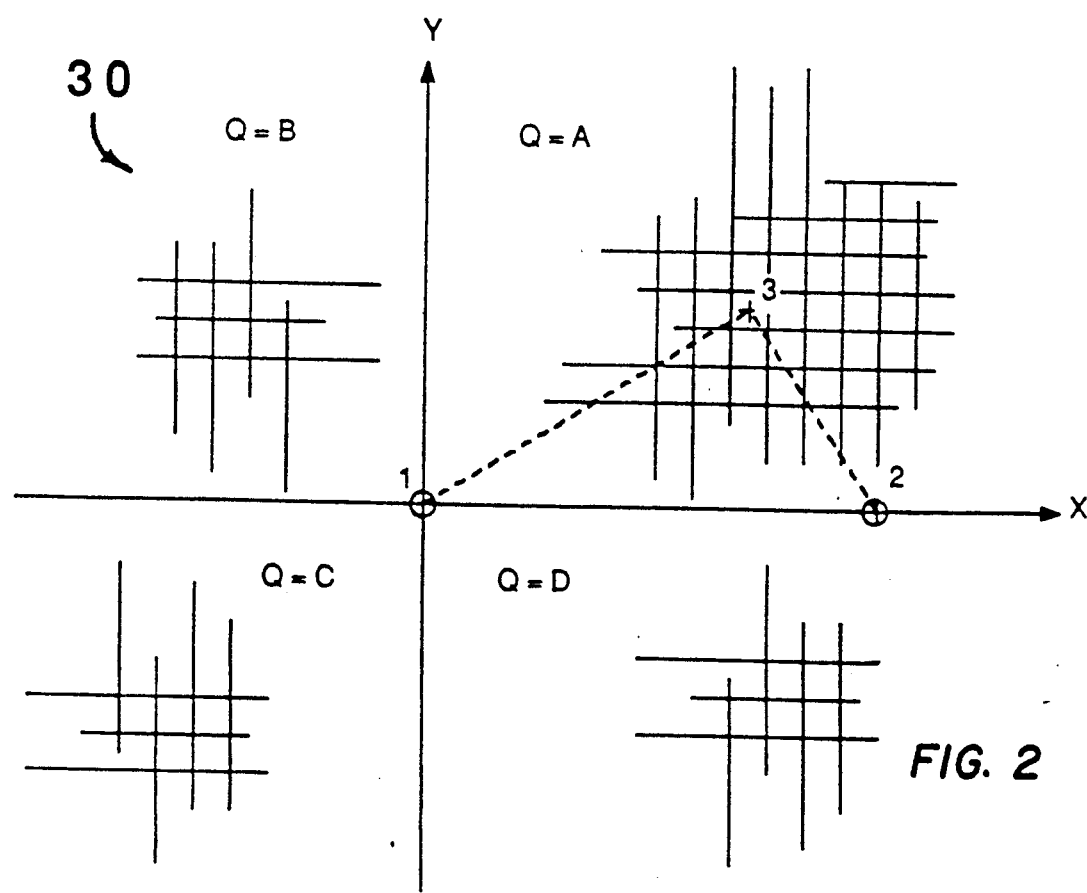
FIG. 2 illustrates the transformation of an overlay's points on the tablet axes to the axes of an OMS to determine the address of the overlay file.

The Overlay Management Space (OMS) 30, which is conceptual in nature, is shown visually in FIG. 2, divided into four quadrant areas Q=A through Q=D positioned on a set of X,Y coordinate axes. Each quadrant is comprised of a plurality of unit square cells, each capable of providing, at the digitizer tablet's output, a signal indicative of its unique position within the matrix of cells. The position of three triangularly orientated points, labeled 1, 2, and 3, is also shown in dotted lines. The point 3 is the file point and the unit cell surrounding the point, when touched by the stylus, will generate the coordinate signal corresponding to a memory address, for accessing the computer file stored at that address. In the preferred embodiment of the invention the number of unit cells along the X axis of each of the quadrants is 30. For the normalized (scaled) triangle the point 2 would thus be 30 units from the origin of point 1.

Figure 3A:
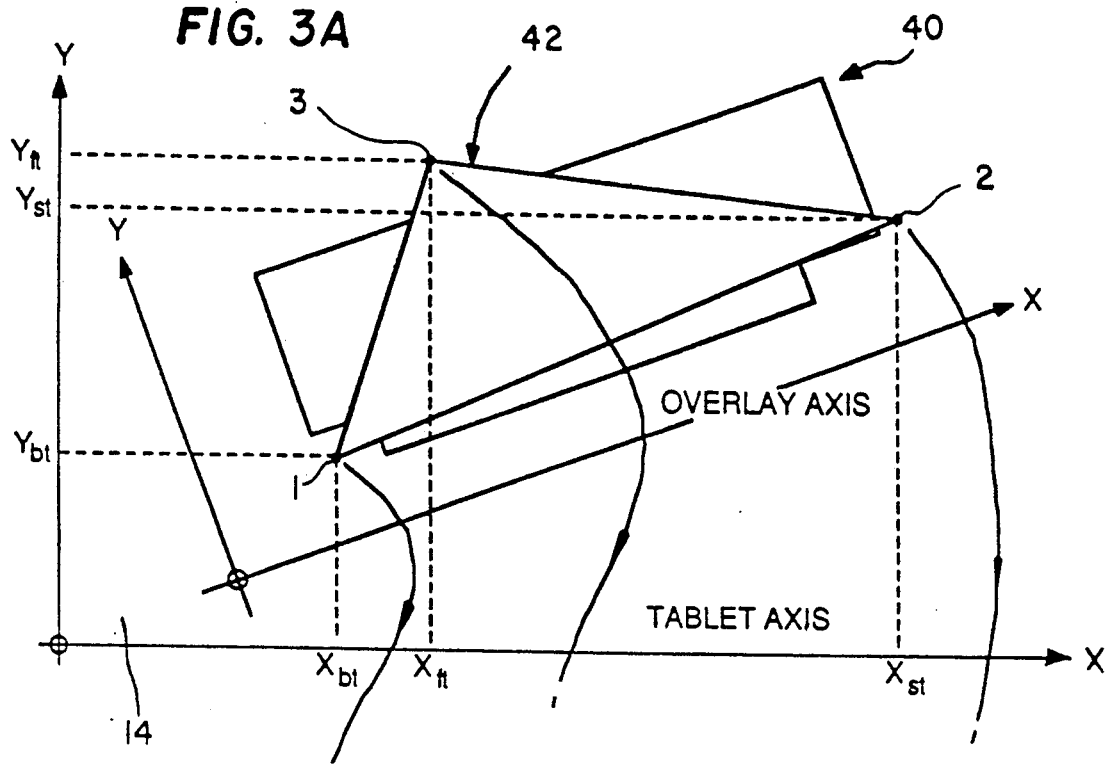
FIGS. 3A and B illustrates the OMS cells and the triangularly positioned points transformed and normalized to the point of origin of the OMS X,Y axes.
Figure 3B:
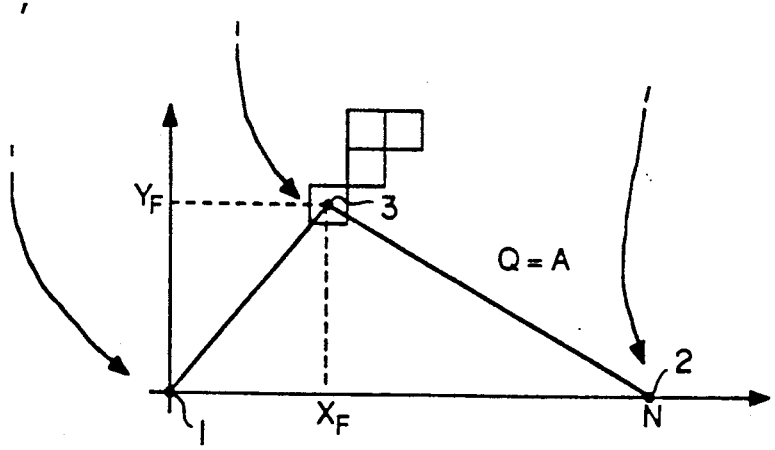

Referring to FIG. 3, an overlay 40 made of paper, plastic or some other like substance, has marked thereon three points, 1, 2, and 3, each positioned at the vertex of an alignment triangle 42. The lines representing the sides of the triangle are shown to assist in understanding the invention but in practice only the three points appear on the overlay. The overlay 40 is randomly positionable on the tablet surface 14. The position of the three points with respect to each other define the angles of a unique triangle that is independent. This independence can then be used to define a unique file address. Because the three points are triangularly related and a triangle also represents the symbol delta, the three points will from time-to-time in this description be refered to as delta-points. The action arrows depict the transformation of the delta-points from the overlay coordinates to the OMS coordinate system. The transformation of the delta-points will position point 3 at the unit square position corresponding to the desired file. Physically the overlay is not moved but electrically there is an effective movement such that the desired file is accessed and the accessed file, or a portion of the accessed file is displayed.

Figure 4:
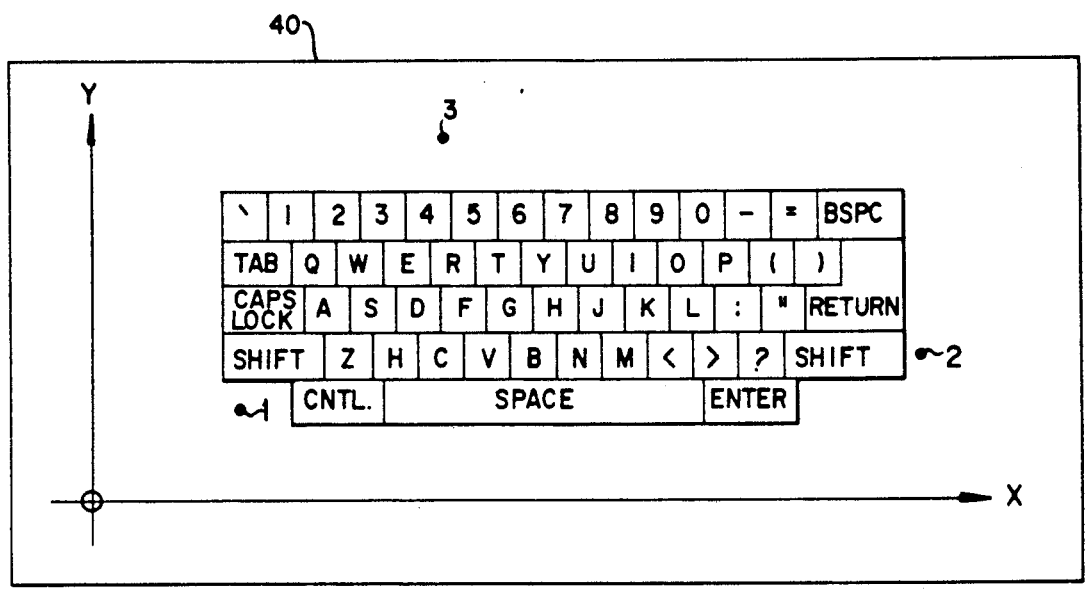
FIG. 4 illustrates one configuration of an overlay with three triangularly positioned points.

Referring now to FIG. 4, for example purposes, one type of overlay 40 is shown. The example overlay has an artwork area that represents keyboard functions and overlay axes that run parallel to the long and the short edge of the overlay. As an aid to the understanding of the invention it will first be assumed that the overlay is sized in the prior art manner such that the function keys of the keyboard will be positioned over designated coordinate points on the tablet surface when the overlay is correctly positioned on the tablet surface, generally with the long edge of the overlay on the X-axis and the short edge on the Y-axis. In such a position, the stylus, when pressed against a desired key will activate the point under the key to ultimately cause the display, or the actual printing, of the character associated with the key. If the key represents a function then the function will be performed. If the overlay thus far described is not properly aligned on the tablet surface pressing the stylus against the desired key of the overlay will result in the wrong character being displayed or no character at all. The same will hold true for the function keys. In the past keyboards have been used in conjunction with the digitizer tablet as an input device to enter an overlay file address for selecting the software file that represented the functions shown on the overlay. The digitizer tablet and overlay were then used as described to display the stylus selected functions.

In one embodiment of the present invention at least three points are added to the overlay. These points are: point 1, the base point, point 2, the scale point, and point 3, the file point. The delta-points represent the unique triangle which hereinafter will be called the delta-point triangle.

Referring back to FIG. 3, the file address (name) is derived by first causing the delta-points to be entered in sequence—base point, scale point, and then file point. Next a coordinate transformation to a new coordinate system is performed and then a truncation of the transformed position of the file point.

The following process is used after the three points are entered to derive the file name.

Let $(X_{bt},Y_{bt})$, $(X_{st},Y_{st})$, and $(X_{ft},Y_{ft})$ be the three X,Y coordinate pairs, with reference to the tablet axis, which define the delta-point triangle.

$(X_{bt},Y_{bt})$ is the base point, $(X_{st}, Y_{st})$ is the scale point, and (Xft,Yft) is the file point. First calculate the four differences:

$$\Delta X_{sbt} = X_{st} - X_{bt} \quad (1)$$

$$\Delta Y_{sbt} = Y_{st} - Y_{bt} \quad (2)$$

$$\Delta X_{fbt} = X_{ft} - X_{bt} \quad (3)$$

$$\Delta Y_{fbt} = Y_{ft} - Y_{bt} \quad (4)$$

Then calculate the square of the delta-point triangle base in tablet units:

$$B_t^2 = \Delta X_{sbt}^2 + \Delta Y_{sbt}^2 \quad (5)$$

The decimal X,Y coordinate pointer to the file name is given by the two equations:

$$X_{FP} = (N/B_t^2)*(\Delta Y_{sb}*\Delta Y_{fb} + \Delta X_{sb}*\Delta X_{fb}), \quad (6)$$

$$Y_{FP} = (N/B_t^2)*(\Delta X_{sb}*\Delta Y_{fb} - \Delta Y_{sb}*\Delta X_{fb}), \quad (7)$$

where N is a normalization factor (Practical values for N range from 5 to 120). This decimal pointer can lie anywhere within the file point cell. The next step truncates the coordinate pairs, such that all values of $(X_{FP},Y_{FP})$ which lie within the unit file point cell yields the same file name.

The integer parts of the file point cell name are then given by:

$$X_F = INT[ABS(X_{FP})] + 1, \quad (8)$$

$$Y_F = INT[ABS(Y_{FP})] + 1 \quad (9)$$

where ABS is the absolute value function, and INT is the integer value function. The file point cell is a unit cell where the ideal file point selection is at the mid point of the cell. There are three major sets of axes, Tablet, Overlay Description File (ODF), and OMS. The overlay artwork axes and the ODF axes are parallel since they originate from the same artwork. They differ only by a scale factor.

The leading character of the file name, denotes the quadrant of the file name in overlay management space, where:

$$Q = A: If X_{FP} > 0 \text{ and } Y_{FP} < 0 \quad (10)$$

$Q = B: If X_{FP} < 0 \text{ and } Y_{FP} > 0$
$Q = C: If X_{FP} < 0 \text{ and } Y_{FP} < 0$
$Q = D: If X > 0 \text{ and } Y_{FP} < 0$ The file name is obtained using:

$$\text{File Name} = Q:X_F:Y_F, \quad (11)$$

where the colon (:) in equation (11) denotes concatinaton.

Three alternative methods for entering the delta points will now be described. Each method has its advantages and disadvantages. A single computer with adequate memory could employ one, or all three of the methods depending on the desired use of the overlays.

Figure 5:
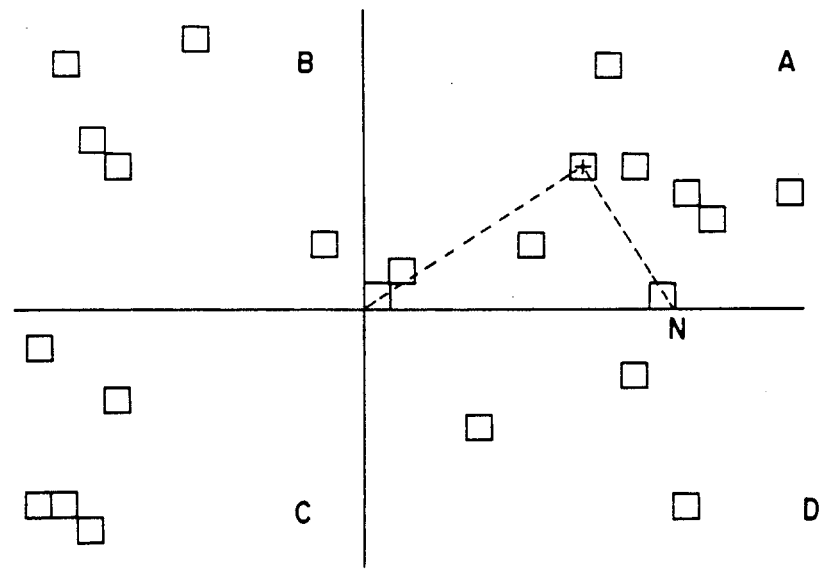
FIG. 5 illustrates the available usage of the OMS when the overlay triangularly positioned points are entered in a specific. 1, 2, 3 sequence.

In the preceeding description the delta-points were entered in the sequence, base point, scale point, and file point. FIG. 5 illustrates a distribution of possible file cells when using the method of fixed sequence entry. The dashed lines drawn from the origin and from point N to the center of a file point cell form a delta-point triangle. The largest number of available file cells is provided with this method of entry. Practically, however, as the shape of the triangle becomes more and more oblique, it becomes more difficult to enter the points of the triangle and to successfully determine the correct file name. A reasonable estimate of practical delta point file names using this entry scheme is $4N^2$. If N=50, then 10,000 file names are possible. It may be desirable to avoid using cells which are adjacent to avoid inadvertent entry. This will reduce the number of valid cells. Note, however, that because the delta point triangle may lie anywhere on the overlay artwork, an accidental entry of a valid delta-point triangle will not produce a meaningful function.

Figure 6:
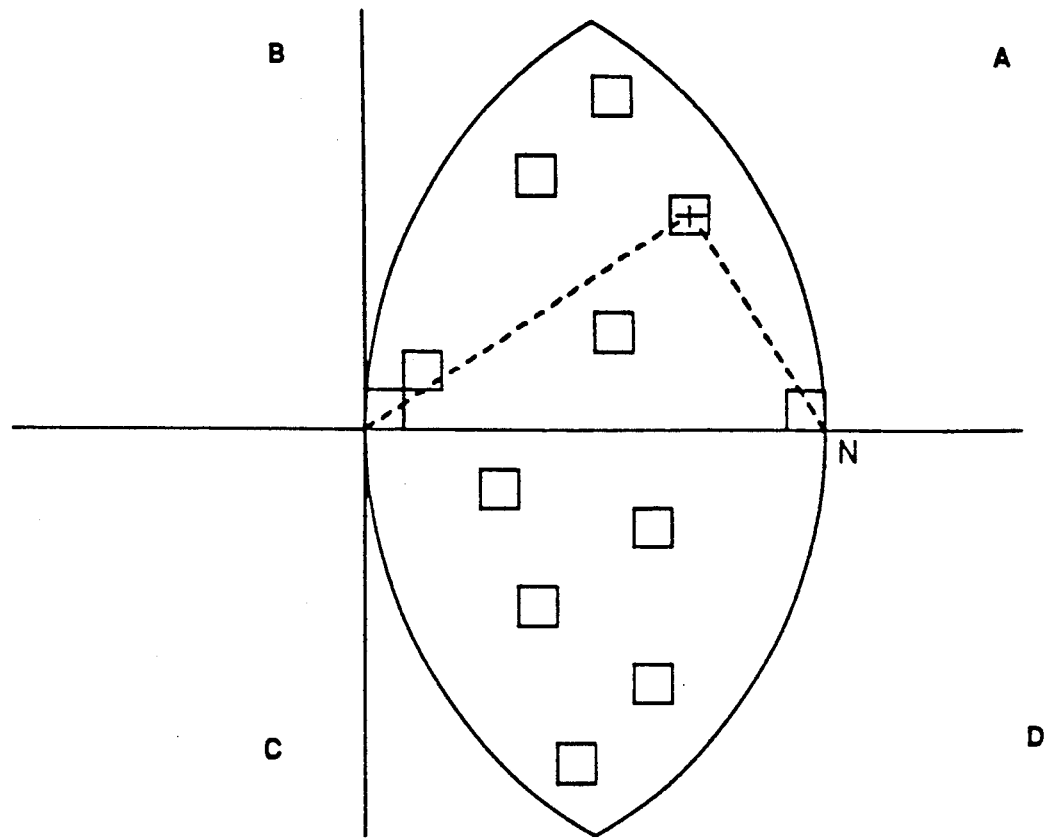
FIG. 6 illustrates the available usage of the OMS when the overlay triangularly positioned points may be entered in either a clockwise or a counter clockwise sequence without regard to a starting point.

The second method of interest is the method which permits either a clockwise or a counter clockwise sequence of point entries. In FIG. 6 all three delta points are entered prior to making the decision on which point is which. The longest side of the delta-point triangle is mapped along the X-axis between the origin and the point N. The remaining delta-point is mapped to a file cell above or below the X-axis depending upon the sequence of entry, for example, a clockwise sequence will map below the axis, and a counter clockwise sequence will map above the axis.

Note that the number of allowable cells is greatly reduced from the number permitted by the fixed sequence entry method. The theoretical number of cells is given by:

$$n = 2[\pi/3 - (\sqrt{3})/4] N^2 \quad (12)$$

For N =50, the number is 3070. This scheme allows a large number of file cells while reducing possible confusion of out-of-sequence entry.

Figure 7:
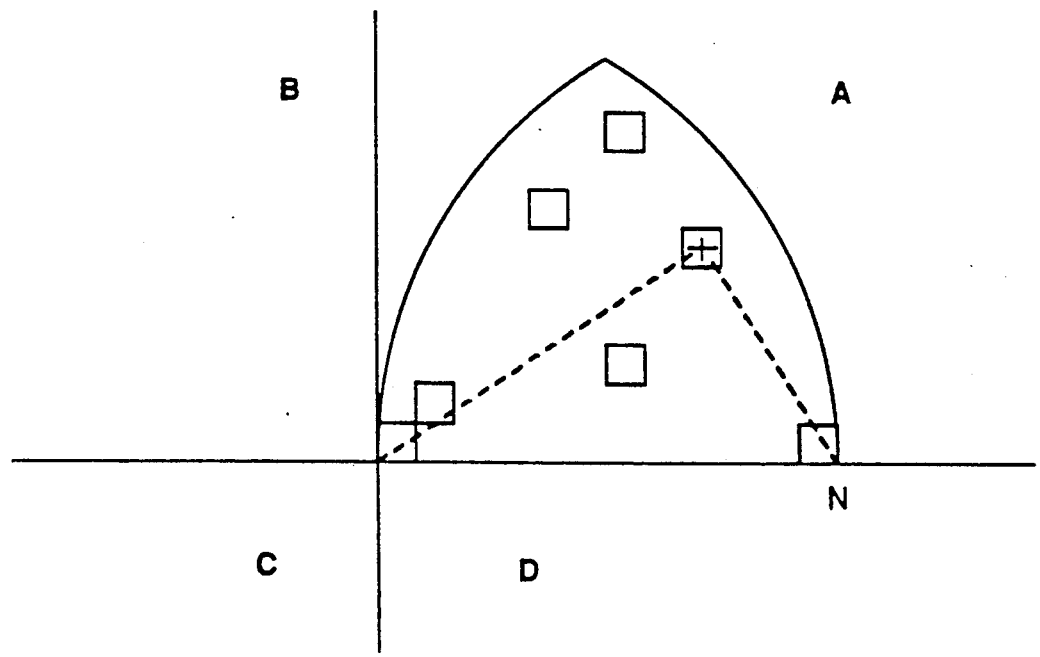
FIG. 7 illustrates the available usage of the OMS when the overlay triangularly positioned points are enterable in a random sequence.

A third method of entry is a total random delta-point entry. In FIG. 7 the region of permissible file points is shown greatly reduced from the first method and equal to one-half of the second method. The procedure for the third entry method maps the longest side of the delta-point triangle to the X-axis, between the origin and the point N. The third point is then always in quadrant A.

When the delta-points have been transformed and normalized to a file name and the overlay description file (ODF) is accessed and temporarily stored, each succeeding tablet point is transformed to the ODF coordinates for table lookup, processing and display.

Each transformed point is examined in approximately the following sequence:
1. Is point on artwork?
2. If Yes, is point in keygroup?
3. If Yes, is point on key?
4. If Yes, take keycode action.

If No on any of above, and there is more than one overlay on the tablet, the point is transformed according to the parameter of the next overlay down and the transformed point is again examined as above.

Figure 8A:
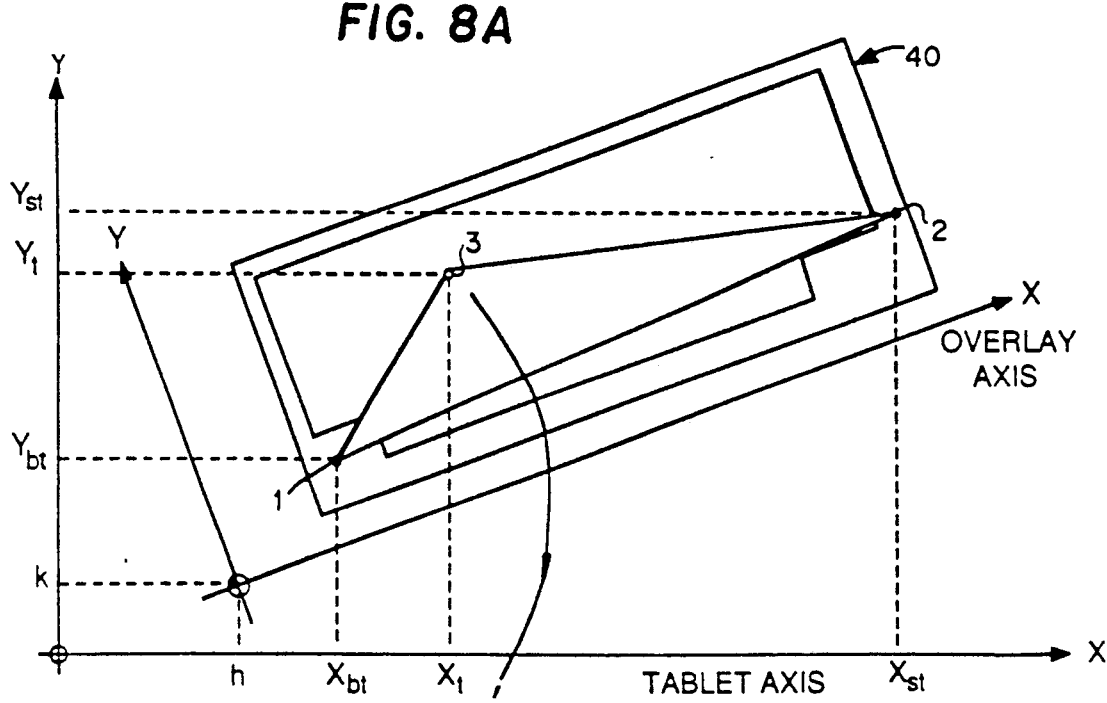
FIG. 8A and B illustrates the transformation of one point of an overlay on the tablet axes to a point on the ODF artwork file coordinate axes.
Figure 8B:
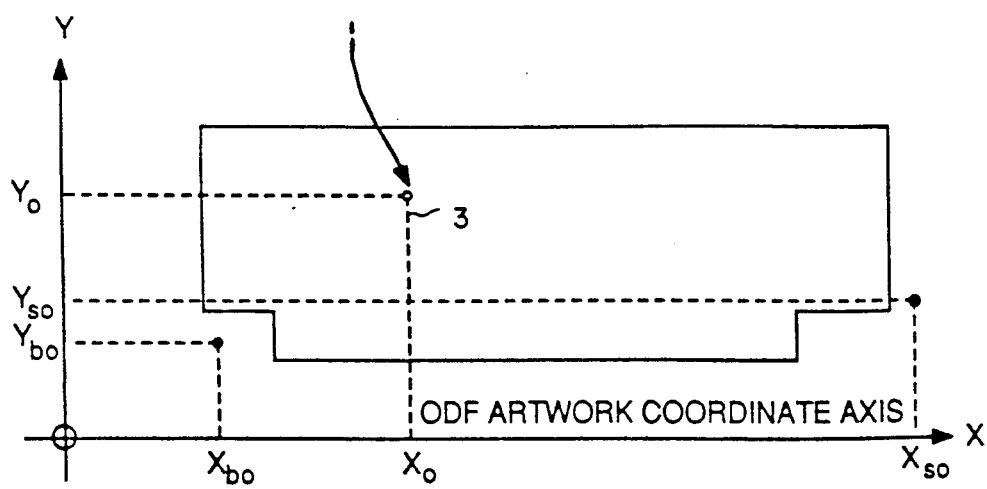

The following describes the mathematical transformations used to transform each point prior to the above decision process. Referring to FIG. 8, let the location of the base point and the scale point (any two of the three points can be used but statistically the longest side will yield the greatest accuracy) in ODF artwork coordinates be given by $(X_{bo}, Y_{bo})$ and $(X_{so}, Y_{so})$ respectively.

The location of these points on the tablet is given by (Xbt,Ybt) and ) where $$X_{bo} = S[(X_{bt} - H)\cos(B) + (Y_{bt} - k)\sin(B)] \quad (13)$$

$$Y_{bo} = S[(Y_{bt} - k)\cos(B) - (X_{bt} - H)\sin(B)]$$
$$X_{so} = S[(X_{st} - H)\cos(B) + (Y_{st} - k)\sin(B)] \quad (14{\text{O}}1)$$

$$Y_{so} = S[(Y_{st} - k)\cos(B) - (X_{st} - h)\sin(B)]$$

and
B = angle of axis rotation
h = axis displacement in the xt direction
k = axis displacement in the yt direction
S = scale factor between the overlay artwork and ODF artwork file
S = $B_o/B_t$, where $B_t$ is given by equation (5) and $B_o$ is given by $$B_o^2 = \Delta X_{sbo}^2 + \Delta Y_{sbo}^2 \quad (15)$$

where $$\Delta X_{sbo} = X_{so} - X_{bo}, \text{ and} \quad (16)$$

$$\Delta Y_{sbo} = Y_{so} - Y_{bo}$$

Geometric analysis of FIG. 8 yields:

$$\cos(B) = (\Delta X_{sbo}\Delta X_{sbt} + \Delta Y_{sbo}\Delta Y_{sbt})/(B_t B_o) \quad (17)$$

$$\sin(B) = (\Delta X_{sbo}\Delta X_{sbt}\Delta Y_{sbo})/(B_t B_o) \quad (18)$$

Substituting equation (17) and (18) into equation (13) and solving for h and k yields, $$h = X_{bt} - [X_{bo}\cos(B) - Y_{bo}\sin(B)]/S \quad (19)$$

$$k = Y_{bt} - [Y_{bo}\cos(B) - X_{bo}\sin(B)]/S \quad (20)$$

Using the derived values for Cos(B), Sin(B), h, and k above, a sample point $(X_t, Y_t)$ is transformed to ODF artwork coordinates using the transformation:

$$X_o = [(X_t - h)\cos(B) + (Y_t - k)\sin(B)]S \quad (21)$$

$$Y_o = [(Y_t - k)\cos(B) - (X_t - h)\sin(B)]S \quad (22)$$

There are disadvantages to a fixed normalization factor, N. If a small value is used to make large cells, fewer cells are available in Overlay Management Space (OMS) and the chance for an accidental entry is greater. Increasing the value of N results in smaller cells. This may require unreasonable precision of point entry, especially for smaller overlays.

The following describes an algorithm which enables groups of smaller cells to be grouped into larger cells. Different sized cells can be chosen in Overlay Management Space without ambiguity in the file name.

Figure 9:
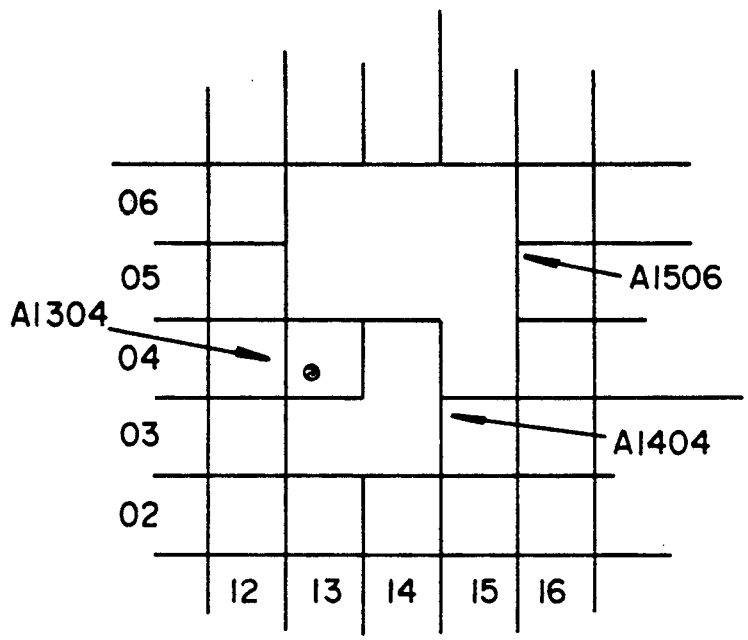
FIG. 9 is an enlarged diagramic view of a method of expanding the OMS unit cells for the same coordinate signal.

Referring to FIG. 9, the algorithm starts with a small cell size (larger N), derives the ODF name, and searches the ODF library. If a match is found for the name and the cell size, the file is accepted. If not, the cell size is increased, a new name is derived, and the process repeated. For example, assume N = 30, and target ODF name of A1506. Assume that the delta point triangle which has been entered is:

base point (BP) = (0,0)

scale point (SP) = (0,600)

file point (FP) = (248,68)

With N = 30, these points produce a file name of A1304 (See equations to 11). The ODF library is checked for this file name and, if found, its contents are examined to see if the file has a unit cell size. Assume no file is found.

N is now reduced to 15 (original N divided by 2), and the resultant file name components given by Equations (8) and (9) are multiplied by 2. This produces a file name of A 1404, still not the target ODF. The process is repeated by dividing N by 3 (N=10) and multiplying the file name components by 3. The resultant file name is now A1506 which is found in the ODF library. The final step is to check the contents of A1506 to make sure that N=10 is specified for this ODF. This being the target ODF, the file is brought into memory and the overlay becomes operative.

Using the described algorithm, the final name of a cell, no matter what size, is given by the name of the unit cell furthest from the origin. If the original file point entered lies in this cell, the A1506 name would be derived and accepted in the first pass.

This algorithm permits ODF file names to be assigned a cell size suited to the function of the overlay. The cell sizes are 1×1, 2×2, 3×3, etc. The cell size could easily be appended to the ODF file name and then it would not be necessary to open the file to check the delta-point entry validity. For example, the file name in the above example could have been defined as "A15063". the last digit indicating that the file has a 3×3 file point cell. As in the case of small unit cells, the location of the file point on the artwork should be in the geometric center of the cell to minimize errors in entry.

In the two point method the geometric shape is a line rather than a triangle. The file name is derived from the length of the line. The line length is derived after entry of the base point and the file point. The ability to scale the size of the overlay is lost because the line length information is used to derive the file name. For example, File Name = INT (line length/N), where N is a normalization factor.

An enhancement was developed using a forth point when it was discovered that a copy made of an overlay might be distorted by the copy machine to such an extent that the three delta points would no longer properly represent a file name. The four point method places a forth point in fixed geometric relationship to two points of the delta point triangle to define a known shape on the overlay, for example, a square and the points represent three corners of the square. If a distorted copy is made of the overlay the square will change to become a rectangle or a parallelogram. The system knows that the points should be positioned at the corners of the square and therefore corrects for the distortion to provide the correct file address. The four point system also permits the delta points to be entered in any order.

To add or delete overlays a control scheme that permits the user to interface with the computer is needed.

Figure 10:
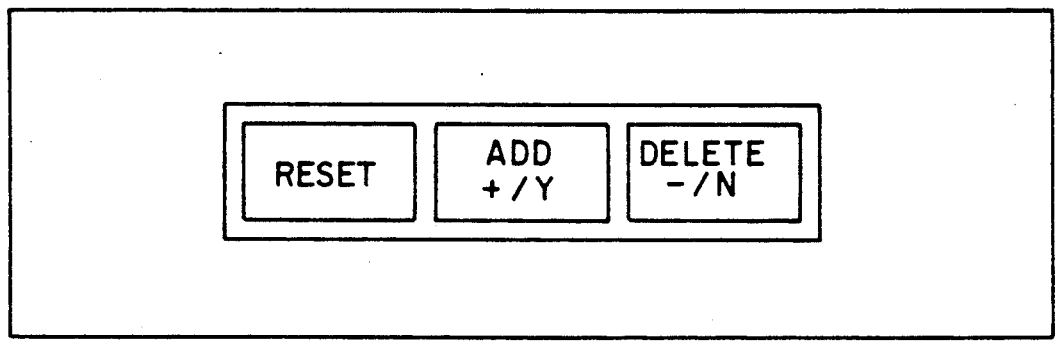
FIG. 10 illustrates a control overlay for initiating RESET, ADD or DELETE functions.

The following is a description of a means for enabling delta-point overlays to be operatively added or deleted from the digitizer surface through the use of a soft keyboard control overlay. Referring to FIG. 10, the control overlay shown is positioned on the digitizer tablet's surface 14. The tablet points positioned under the RESET, ADD and DELETE areas of the overlay provide coordinate signals which are converted by the keyboard processor 22 into computer function signals that cause the computer to respond accordingly.

Following is a description of each function key and its preferred embodiment:

RESET: Activation of this function instructs the keyboard processor 22 that the user wishes to perform a reset function. A reset message is sent to the personal computer which in turn displays a response message on the CRT. For example, the message "ARE YOU SURE?", after which the user might respond by depressing the ADD +/Y key. This sequence would clear the system of all active overlays.

ADD +/Y: This function key is used to instruct the processor that the user wishes to add an overlay to the digitizer tablet surface. Messages displayed on the CRT could provide instruction on delta-point triangle entry. Alternative, this key can be used to enter positive responses to system messages such as was explained in the preceeding section on the RESET key.

DELETE —/N This key is the complement of the ADD key. It is used to indicate removal of an overlay or to negatively respond to system prompts. For example, if the user wishes to remove an overlay from the tablet surface, he may first touch the DELETE key and then touch an area on the overlay he wishes to remove. The DELETE function may be followed with system messages such as "ARE YOU SURE? ".

APPENDIX A is a software program written in BASIC for implementing the present invention on an APPLE MACINTOSH computer.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

Appendix A

```
00010 '            DELTA-POINT KEYBOARD FEATURES DEMONSTRATION
00020
00030 '    This program demonstrates the following features:
00040 '       • Delta-Point processing and Delta-Point file lookup
00050 '       • Variable Cell size
00060 '       • Multiple overlays, duplicate overlays (latest one retrieved from memory.
00070 '       • Priority of Control Overlay
00080 '       • Add, Remove, and Reset features of the Control overlay.
00090 '       • Alpha keyboard processing
00100 '       • Miscellaneous other features
00110 '       • The ODF's are placed on a diskette and retrieved by this program.
00120
00130 '    Set the Scriptel tablet to Scriptel Option 2 Data format. (9600 baud)
00140 '    Program written for the Apple Macintosh computer (512K Mac) in ZBASIC
00150
00160 MENU 1,0,1, "                    DELTA-POINT KEYBOARD DEMONSTRATION"
00170 COORDINATE WINDOW
00180 WINDOW #2,"",(126,37)-(386,297),2
00190 TEXT 0,12,0
00200 WINDOW #3,"Message Window',(8,322)-(330,336),2
00210 TEXT 0,12,0
00220 WINDOW #4,"Command Window",(345,322)-(505,336),2
00230 TEXT 0,12,0
00240 CALL OBSCURECURSOR
00250 CALL SHOWPEN
00260 DEFINT W, S, P
00270 PenSize=2
00280 GOSUB "PenSiz"
00290 '            THIS SECTION SETS UP THE TABLET
00300 OPEN"C",-1,9600,0,0,0,16
00310 PRINT#-1, "R2=2":      '   Scriptel Option 2 - 4 Character ASCII
00320 PRINT#-1, "R5=0":      '   CR terminator
00330 PRINT#-1, "R1=7":      '   200 CPPS
00340 PRINT#-1, "R0=2":      '   0 = Continuous,  2 = Point mode.
00350 PRINT#-1, CHR$(17):    '   Issues XON command to tablet.
00360 READ#-1,A$;0: IF LEN(A$) THEN GOTO 360    '  Empties buffer to CR
00370 PRINT#-1, CHR$(19):    '   Issues XOFF command to tablet.
00380 PRINT#-1, "R0=0":      '   0 = Continuous,  2 = Point mode.
00390
00400 CNTLOL$ = "A1527"      '   Control overlay specified here is highest priority.
00410
00420 "Beginning":           '   _____Beginning:
00430 Points%=0              '   Initializes sample rate point count.
00440 W1First%=1             '   Initializes Flag, Sets up Window #1 only once.
00450 MaxMOL% = 5:           '   Maximum number of different ODFs accepted
```

```
00460 MAXTL% = 10:              '     Maximum number of paper overlays  accepted
00470 MaxLines% = 64:           '     Maximum number of lines allowed in ODF.
00480 TLNo% = 0                 '     Initialization of overlay sequence No. ("Address")
00490
00500 '    NOLs% is sequence number associated with a specific ODF.
00510 '    NAOLs% is the number of active overlays.
00520 DIM TPAT%(12,4,2):        '     Holds Delta-Points from tablet.
00530 DIM ODF%(5,66,7):         '     Holds ODF key boundary descriptons.
00540 DIM Temp%(7)              '     Temporaty ODF% hold array.
00550 DIM 20 Code$(5,66,5)      '     Holds ODF code information.
00560 DIM 20 Temp2$(5)          '     Temporary code array.
00570 DIM XY%(10,5,4):          '     Holds XY key information.
00580 DIM TPAO%(5,6,2):         '     Holds Delta-Points from ODFs.
00590 DIM NO%(11,10):           '     Holds Overlay scan table (1), overlay address (2),
00600 '                               modifier key states (3-8), & window pointer(9).
00610 DIM CC%(10,4)             '     Holds redundant calculations for "Xform".
00620 DIM Chunk%(500)           '     Adjust to Handwriting Spot size
00630 DIM PChunk%(500)          '     Adjust to Cursor size
00640 DIM Wind%(9000)           '     Must match Window #2 requi' ents.
00650 MaxXYs%=3                 '     The maximum number of XY switched Window #1 pages.
00660 DIM Wind1%(3,20000)       '     Must be large enough for multiple images.
00670 NOLs% = 0:                '          Number of ?
00680 NAOLs% = 0:               '          Number of Active Overlays.
00690 DIM KGs%(5,20,2):         '     Holds keygroup descriptions.
00700 LastXYImage%=1            '     Initializing to prevent 0 subscript.
00710 SaveImage%=1
00720 CLS
00730
00740 "1": WINDOW #1: GET(118,29)-(394,305),Wind%(1)
00750 "11": PUT(118,29), Wind%(1)
00760 "111": GotIT% = 0: Acc$ = ""    '    Get New Delta-Point Keyboard.
00770 FOR Cell% = 1 TO 4              '    Increase size of FP cell up to 4 x 4.
00780 Norm% = 30                      '    Norm% is OMS normalization factor.
00790 IF Cell% = 1 THEN GET(118,29)-(394,305),Wind%(1): GOSUB "GetDelPts"
00800 GOSUB "GetName"
00810
00820 '  Use the following statement to see ODF file scan.
00830              Msg$="File Name is: "+FileName$: GOSUB "PrintMsg": DELAY 3000
00840
00850 '  The ODF's must be placed on a diskette titled "DPK Demo Disk" in DP ODF folder.
00860 TheName$ = "DPK Demo Disk:" + " DP ODF " + FileName$ '"DP ODF's:" +
00870
00880 GOSUB "MemODF":           '     First look for ODF in memory.
00890 IF GotIT% <> 2 THEN GOTO "2"
00900 Msg$="FOUND IN MEMORY": GOSUB "PrintMsg"
00910 GOSUB "Triangle"
00920
00930 '     Found ODF, but check to see if cell size is acceptable.
00940 IF Cell%<=VAL(Code$(MemI%,1,3)) THEN GOTO "5" ELSE Msg$="More Accuracy required. .
      .": GOTO "7"
00950 '    Branch to "5" indicates a valid ODF found in Memory
00960
00970 "2" GOSUB "DiskODF":       '     Now look for ODF on disk.
00980 IF GotIT% <> 1 THEN GOTO "6"
00990 GOSUB "Triangle"
01000 IF Cell%<=VAL(Code$(Slot%,1,3)) THEN GOTO "3" ELSE Msg$="More Accuracy required. .
      .": GOTO "7"
01010 '    Branch to "3" indicates a valid ODF found on disk.
01020
01030 "6"
01040 NEXT Cell%
01050 '
01060 IF GotIT% = 0 THEN GOSUB "Boop": CLS: Msg$="Use Greater Accuracy On Points!"
01070 '    Didnt find in Memory or Disk.
01080 "7" GOSUB "CLRCmd": GOSUB "PrintMsg": DELAY 1000: IF NOLs% >=1 THEN GOTO 1410 ELSE
      GOTO "11"
01090 "3"
01100 '         First ODF (or control ODF) is placed in position #1.
01110 IF NOLs% = 0 THEN TimeWas& = TIMER: Points%=0: AdRmv%=1: OLNo%=1: GOSUB "AddRmv":
      GOTO "4"
01120 IF NOLs% < MaxMOL% THEN IF FileName$ = CNTLOL$ THEN AdRmv%=1: OLNo%=NOLs%: GOSUB
      "AddRmv" ELSE AdRmv%=2: OLNo%=NOLs%+1: GOSUB "AddRmv"
01130 "4"     Msg$="FOUND ON DISK": GOSUB "PrintMsg"
```

```
01140 GOSUB "SortKGs"
01150 Msg$=Code$(NOLs%,1,1)+" is loaded."
01160 GOTO "49"
01170
01180 "5"
01190 AdRmv%=2: OLNo%=MemI%: GOSUB "AddRmv"        '    I% is where it was found in memory.
01200 Msg$=Code$(MemI%,1,1)+" is ready."
01210 GOTO "49"
01220 '
01230 "Triangle":
01240 FilePx%=130+4*Xnam*Cell%:
01250 FilePy%=130-4*Ynam*Cell%:
01260 CIRCLE FILL FilePx%,FilePy%,3:
01270 PLOT 250,130 TO FilePx%,FilePy%
01280 RETURN
01290 '
01300 "Good":
01310 PLOT FilePx%,FilePy% TO 130,130
01320 PEN 1,1
01330 FOR Cir%=1 TO 300 STEP 4+Cir%^1.7/100
01340 CIRCLE FilePx%,FilePy%,Cir%
01350 NEXT Cir%
01360 RETURN
01370 '
01380
01390 "49":
01400 GOSUB "Good": DELAY 200: GOSUB "CLRCmd": GOSUB "PrintMsg"
01410 IF NOLs%=1 AND W1First% THEN WINDOW #1,"Main Window",(0,20)-(512,314),3: TEXT
      0,12,0: GOSUB "PenSiz": W1First%=0
01420 WINDOW #1
01430 IF NAOLs%>1 THEN PUT (118,29), Wind%(1)
01440
01450 "50":              ' Reads points and Returns Keycodes
01460 GOSUB "GetPoint"   '   Eliminate OnKB%=0 to require touch on higher priority KBs
01470 IF PBDwn% OR PBUp% OR OnKB%=0 THEN OLLast%=1 ELSE OLLast%=iN%
01480 FOR iN% = OLLast% TO NAOLs%
01490 Col% = NO%(iN%,1)                            '  Search Active ODFs for key.
01500 GOSUB "Xform"
01510 IF Xo% < ODF%(Col%,1,1) OR Xo% > ODF%(Col%,1,3) THEN OnKB%=0: GOTO "51"   ' Not on KB
01530 IF Yo% < ODF%(Col%,1,2) OR Yo% > ODF%(Col%,1,4) THEN OnKB%=0: GOTO "51"   ' Not on KB
01540 OnKB% = 1
01550 IF NO%(iN%,9)=LastXYImage% OR ODF%(Col%,1,7)=0 OR NoOfXYs%<2 THEN GOTO 1640
01560 Msg$= "• WINDOW "+STR$(NO%(iN%,9))+ " •": GOSUB "PrintMsg"
01570 PUT (X1P%,Y1P%)-(X2P%,Y2P%), Chunk%(1), PSET
01580 PUT (PX1P%,PY1P%)-(PX2P%,PY2P%), PChunk%(1), PSET
01590 Freeze%=0
01600 GET(0,0)-(512,294), Wind1%(LastXYImage%,1)
01610 PUT(0,0)-(512,294), Wind1%(NO%(iN%,9),1), PSET
01620 SaveImage%=LastXYImage%
01630 LastXYImage%=NO%(iN%,9)
01640 GOSUB "GetKey"
01650 IF Inout% <> 1 THEN GOTO "50"                 '   On KB, but not on a key.
01660
01670 '
01680 '   Handle Control Overlay keys.
01690 IF Code$(Col%,1,4) <> "DPC" THEN GOTO "Alpha"
01700 IF PBDwn%=0 THEN GOTO "50"
01710 GOSUB "Click"
01720 IF ODF%(Col%,I%,7)=2 THEN Cmd$=Code$(Col%,I%,1): GOSUB "PrintCmd": DELAY 600
01730 IF ODF%(Col%,I%,7)=5 THEN Msg$=Code$(Col%,I%,1): GOSUB "PrintMsg"
01740 IF Code$(Col%,I%,1) <> "ADD" THEN GOTO "100"
01750 IF NOLs% = MaxMOL% OR NAOLs% = MaxTL% THEN GOTO "50"
01760 GOTO "111"
01770
01780 "100"   IF Code$(Col%,I%,1) <> "REMOVE" THEN GOTO "110"
01790 Msg$="TOUCH KEYBOARD TO BE REMOVED": GOSUB "PrintMsg"
01800 GOSUB "NextKB"
01810 IF OnKB%=0 THEN GOTO "50"
01820 IF iN%=1 AND Code$(Col%,1,4)="DPC" THEN GOSUB "Sorry": GOTO "50"
01830 IF ODF%(Col%,1,7)>0 THEN CLS: GET(0,0)-(512,294),Wind1%(NO%(iN%,9),1): PUT (0,0)-
      (512,294),Wind1%(SaveImage%,1), PSET
01840 IF OnKB%=1 THEN AdRmv%=3: OLNo%=iN%: GOSUB "AddRmv": GOTO "50"
01850
```

```
01860 "110"    IF Code$(Col%,I%,1) = "RESET" THEN GOTO "Beginning"
01870 GOTO "50"
01880
01890 "Alpha":       '  _____  "Alpha"
01900 IF Code$(Col%,1,4) <> "ALP" THEN GOTO "Other"
01910 IF ODF%(Col%,I%,7)=3 THEN GOTO "XY"
01920 IF PBDwn%=1 THEN GOSUB "Click": ELSE GOTO "50"
01930 IF ODF%(Col%,I%,7)=1 THEN GOTO "String"
01940 IF ODF%(Col%,I%,7)=4 THEN GOTO "Modifier"
01950 IF ODF%(Col%,I%,7)=2 THEN GOTO "Function"
01960
01970 "Other":       '  _____  "Other" Temporary ODF    type.
01980 GOTO "50"
01990
02000 "XY":
02010 IF PBDwn% GOSUB "Click"
02020 Xprime%=(Xo%-ODF%(Col%,I%,1))*(XY%(Col%,1,3)-XY%(Col%,1,1))/(ODF%(Col%,I%,3)-
      ODF%(Col%,I%,1))
02030 Yprime%=XY%(Col%,1,2)+(Yo%-ODF%(Col%,I%,2))*(XY%(Col%,1,4)-
      XY%(Col%,1,2))/(ODF%(Col%,I%,4)-ODF%(Col%,I%,2))
02040 IF Xprime%=XLast% AND Yprime%=YLast% AND PBWas%=PBLast% THEN GOTO "50"
02050 IF NOT(DrawPoint%) THEN GOTO "Point"
02060 X1% = WXLast%-WhiteSize: Y1% = WYLast%-WhiteSize
02070 X2% = WXLast%+WhiteSize: Y2% = WYLast%+WhiteSize
02080 IF PBDwn%=1 THEN PUT (X1P%,Y1P%)-(X2P%,Y2P%), Chunk%(1), PSET
02090 IF PB%=0 AND PBUp%=0 THEN PUT (X1P%,Y1P%)-(X2P%,Y2P%), Chunk%(1), PSET
02100 X1P% = Xprime%-WhiteSize: Y1P% = Yprime%-WhiteSize
02110 X2P% = Xprime%+WhiteSize: Y2P% = Yprime%+WhiteSize
02120 GET (X1P%,Y1P%)-(X2P%,Y2P%), Chunk%(1)
02130 IF PB%=0 OR PBUp%=1 THEN GOTO 2170
02140 PLOT X1%+1,Y1%+1 TO X1P%+1,Y1P%+1:
02150 GOTO 2190
02160
02170 COLOR=0: CIRCLE FILL Xprime%,Yprime%,WhiteSize
02180 COLOR=-1: CIRCLE FILL Xprime%,Yprime%,SpotSize
02190 WXLast%=Xprime%: WYLast%=Yprime%
02200 XLast%=Xprime%: YLast%=Yprime%
02210 GOTO "50"
02220
02230 "Point"
02240 IF PBDwn% THEN Freeze%=NOT(Freeze%)
02250 IF Freeze% THEN GOTO "50"         '   Cursor is in fixed position.
02260 PUT (PX1P%,PY1P%)-(PX2P%,PY2P%), PChunk%(1), PSET
02270 PX1P% = Xprime%-8: PY1P% = Yprime%-8
02280 PX2P% = Xprime%+8: PY2P% = Yprime%+8
02290 GET(PX1P%,PY1P%)-(PX2P%,PY2P%), PChunk%(1)
02300 COLOR=0: BOX PX1P%,PY1P% TO PX2P%,PY2P%
02310 COLOR=-1: BOX PX1P%+1,PY1P%+1 TO PX2P%-1,PY2P%-1
02320 CALL MOVETO (Xprime%+9,Yprime%+4)
02330 PXLast%=Xprime%: PYLast%=Yprime%
02340 XLast%=Xprime%: YLast%=Yprime%
02350 GOTO "50"
02360
02370 "Modifier"
02380 IF Code$(Col%,I%,1) = "SHFT" THEN NO%(iN%,3) = -1: GOTO "50"
02390 IF Code$(Col%,I%,1) = "CLOK" THEN NO%(iN%,4) = NOT(NO%(iN%,4)): NO%(iN%,3)=0:
      NO%(iN%,5)=0: GOTO "50"
02400 IF Code$(Col%,I%,1) = "SHLK" THEN NO%(iN%,5) = NOT(NO%(iN%,5)): NO%(iN%,3)=0:
      NO%(iN%,4) =0: GOTO "50"
02410 IF Code$(Col%,I%,1) = "OPTN" THEN NO%(iN%,6) = -1:  GOTO "50"
02420 IF Code$(Col%,I%,1) = "OPLK" THEN NO%(iN%,7) = NOT(NO%(iN%,7)): NO%(iN%,6) = 0: GOTO
      "50"
02430 IF Code$(Col%,I%,1) = "CNTL" THEN NO%(iN%,8) = -1:  GOTO "50"
02440 IF Code$(Col%,I%,1) = "RSKB" THEN FOR J%=3 TO 8: NO%(iN%,J%)=0: NEXT J%: GOTO "50"
02450 GOTO "50"
02460
02470 "String"
02480 IF NO%(iN%,8)=-1 THEN PRINT Code$(Col%,I%,3);: NO%(iN%,8)=0: GOTO "50"
02490 IF NO%(iN%,4)=-1 AND NO%(iN%,3)=0 AND NO%(iN%,5)=0 AND NO%(iN%,6)=0 AND NO%(iN%,7)=0
      THEN P$=Code$(Col%,I%,1): GOSUB "PrCode2": NO%(iN%,3)=0: GOTO "50"
02500 IF (NO%(iN%,3)=-1 OR NO%(iN%,5)=-1) AND NO%(iN%,6)=0 AND NO%(iN%,7)=0 THEN
      P$=Code$(Col%,I%,2): GOSUB "PrCode": NO%(iN%,3)=0: GOTO "50"
02510 IF NO%(iN%,3)=0 AND NO%(iN%,4)=0 AND NO%(iN%,5)=0 AND (NO%(iN%,6)=-1 OR NO%(iN%,7)=-
      1) THEN PRINT Code$(Col%,I%,4);: NO%(iN%,6)=0: GOTO "50"
```

```
02520 IF (NO%(iN%,3)=-1 OR NO%(iN%,4)=-1 OR NO%(iN%,5)=-1) AND (NO%(iN%,6)=-1 OR
      NO%(iN%,7)=-1) THEN PRINT Code$(Col%,I%,5);:NO%(iN%,6)=0: GOTO "50"
02530 P$ = Code$(Col%,I%,1)
02540 GOSUB "PrCode"
02550 GOTO "50"
02560
02570 "PrCode"
02580 L% = LEN(P$)
02590 IF L% < 5 THEN PRINT P$;: GOTO "EndPr"      '    A String.
02600 FOR J% = 1 TO L% STEP 3                     '    A CHR$ string.
02610 PRINT CHR$(VAL(MID$(P$,J%,3)));
02620 NEXT J%
02630 "EndPr":    RETURN
02640 "PrCode2":  L% = LEN(P$)
02650 IF L% < 5 THEN PRINT UCASE$(P$);:: GOTO "EndPr2"
02660 FOR J% = 1 TO L% STEP 3
02670 PRINT CHR$(VAL(MID$(P$,J%,3)));
02680 NEXT J%
02690 "EndPr2":   RETURN
02700
02710 "Function":
02720 Cmd$=Code$(Col%,I%,1): GOSUB "PrintCmd"
02730 IF Code$(Col%,I%,1) = "QUIT" THEN BEEP: CLS: GOSUB "Rate": END
02740 IF Code$(Col%,I%,1) = "CLEAR" THEN CLS
02750 IF Code$(Col%,I%,1) = "Pointer/Handwriting" THEN DrawPoint%=NOT(DrawPoint%): IF
      DrawPoint% THEN Cmd$="Handwriting": GOSUB "PrintCmd" ELSE Cmd$="Pointer": GOSUB
      "PrintCmd"
02760 GOTO "50"
02770 "51"  NEXT iN%
02780 GOTO "50"
02790
02800 "DiskError":
                                           '   Disk Error Handling - File not found
02810 ERROR = 0
02820 RETURN 980
02830 END
02840
02850
02860 '                    _____ SUBROUTINE SECTION _____
02870
02880 "MemODF":                    '   Searches Memory for ODF.
02890 FOR MemI% = 1 TO NOLs%
02900 IF FileName$ = Code$(MemI%,1,2) THEN GotIT% = 2: GOTO "53"
02910 NEXT MemI%
02920 "53"     RETURN
02930 '       _____
02940
02950 "NextKB":                    '   Returns value of iN% if point is on KB.
02960 GOSUB "GetPoint": IF PBDwn%<>1 THEN GOTO 2960
02970 GOSUB "Click"
02980 OnKB% = 0
02990 FOR iN% = 1 TO NAOLs%        '   Search Active ODFs
03000 Col% = NO%(iN%,1)
03010 GOSUB "Xform"
03020 IF Xo% < ODF%(Col%,1,1) OR Xo% > ODF%(Col%,1,3) THEN GOTO "52"
03030 IF Yo% < ODF%(Col%,1,2) OR Yo% > ODF%(Col%,1,4) THEN GOTO "52"
03040 OnKB% = 1
03050 GOTO "53"
03060 "52" NEXT iN%
03070 "53"  '   PRINT "OnKB% = ";OnKB%, "iN% = ";iN%,"NAOLs% = ";NAOLs%
03080 RETURN
03090 '       _____
03100
03110 "DiskODF":                   '   Search for ODF on disk.
03120 ON ERROR GOSUB "DiskError"
03130 OPEN "I",2,TheName$: GotIT% = 1: Msg$="- - - • PLEASE WAIT • - - -": GOSUB
      "PrintMsg"
03140 ERROR = 0
03150 ON ERROR RETURN
03160 '  Input ODF
03170 Slot% = NOLs%+1
03180 INPUT #2, Norm%
03190 INPUT #2,TPAO%(NOLs%+1,1,1),TPAO%(NOLs%+1,1,2):    '   Base point.
```

```
03200 INPUT #2,TPAO%(NOLs%+1,2,1),TPAO%(NOLs%+1,2,2):    '   Scale point.
03210 INPUT #2,TPAO%(NOLs%+1,3,1),TPAO%(NOLs%+1,3,2):    '   File point.
03220 INPUT #2,TPAO%(NOLs%+1,4,1),TPAO%(NOLs%+1,4,2):    '   Validation point.
03230 INPUT #2,IEnd%:                                    '    EOF pointer
03240 FOR J% = 1 TO 7:   INPUT #2, ODF%(Slot%,1,J%): NEXT J%
03250 FOR J% = 1 TO 5:   INPUT #2, Code$(Slot%,1,J%): NEXT J%
03260 FOR I% = 2 TO IEnd%
03270 FOR J% = 1 TO 7:   INPUT #2, ODF%(Slot%,I%,J%): NEXT J%
03280 FOR J% = 1 TO 5:   INPUT #2, Code$(Slot%,I%,J%): NEXT J%
03290 NEXT I%
03300 IF ODF%(Slot%,1,7) = 0 THEN GOTO 3360
03310 FOR I% = 1 TO ODF%(Slot%,1,7)              '   XY Key Scale Factors
03320 FOR J% = 1 TO 4
03330 INPUT #2, XY%(Slot%,I%,J%)
03340 NEXT J%
03350 NEXT I%
03360 CLOSE# 2
03370 '                                This segment derives KG bounds.
03380 JStart% = ODF%(NOLs%+1,1,5) + 2
03390 FOR I% =  JStart% TO  JStart%  + ODF%(NOLs%+1,1,6)-1
03400 KGs%(NOLs%+1,I%,1) = ODF%(NOLs%+1,I%,7):   KGs%(NOLs%+1,I%,2) = ODF%(NOLs%+1,I%,7) +
      ODF%(NOLs%+1,I%,6)-1
03410 NEXT I%
03420 RETURN
03430 ' _____
03440
03450 "GetDelPts": IF NAOLs%=0 THEN WINDOW CLOSE #1
03460 WINDOW #2: PEN 1,1
03470 PLOT 130,0 TO 130,260: PLOT 0,130 TO 260,130
03480 PEN 3,3: PBDwn%=0
03490 FOR I%=1 TO 3
03500 IF I% = 1 THEN GOSUB "CLRCmd": Msg$ = "Enter BASE Point": GOSUB "PrintMsg"
03510 IF I% = 2 THEN Msg$ = "Enter SCALE Point": GOSUB "PrintMsg"
03520 IF I% = 3 THEN Msg$ = "Enter FILE Point": GOSUB "PrintMsg"
03530 GOSUB "GetPoint": IF PBDwn%<>1 THEN GOTO 3530
03540 GOSUB "Click"
03550 IF I%=1 THEN COLOR=-1: CIRCLE FILL 130,130,4
03560 IF I%=2 THEN COLOR=-1: CIRCLE FILL 250,130,4: PLOT 130,129 TO 250,129
03570
03580 Cmd$=STR$(I%):  GOSUB "PrintCmd"
03590 TPAT%(12,I%,1)=Xt%
03600 TPAT%(12,I%,2)=Yt%
03610 NEXT I%
03620 RETURN
03630 ' _____
03640
03650 "GetPoint":
03660 B$ = INKEY$
03670 IF LEN(B$) THEN IF B$="n" THEN FOR I%=1 TO 5: PRINT NO%(I%,9);" ";: NEXT I%: PRINT
      "Last XY =";LastXYImage%; "<< NO%(I%,9)"
03680 IF LEN(B$) THEN IF B$="m" THEN FOR I%=1 TO 5: PRINT NO%(I%,1);" ";: NEXT I%: PRINT
      "Last XY ="; "<< NO%(I%,1)"
03690 IF LEN(B$) THEN GOSUB "Click": PRINT B$;: IF B$="`" THEN BEEP: GOSUB "Rate": END
03700 PRINT#-1, CHR$(17)
03710 INPUT#-1,Xt%,Yt%,PB%
03720 PRINT#-1, CHR$(19)
03730 IF PBLast%=0 AND PB% = 1 THEN PBDwn% = 1 ELSE PBDwn% = 0
03740 IF PBLast%=1 AND PB% = 0 THEN PBUp% = 1 ELSE PBUp% = 0
03750 PBWas%=PBLast%           '    Used in "XY"
03760 PBLast% = PB%
03770 Points% = Points% + 1
03780 RETURN
03790 ' _____
03800
03810 "Click":
03820 SOUND 2000,18,255
03830 RETURN
03840
03850 "Boop":
03860 SOUND 200,50,150
03870 RETURN
03880 ' _____
03890
```

```
03900 "GetName":
03910 Norm% = Norm%/Cell%
03920 DELX31% = TPAT%(12,3,1)-TPAT%(12,1,1)
03930 DELY31% = TPAT%(12,3,2)-TPAT%(12,1,2)
03940 DELX21% = TPAT%(12,2,1)-TPAT%(12,1,1)
03950 DELY21% = TPAT%(12,2,2)-TPAT%(12,1,2)
03960 TPABaseSq& = DELX21%^2 + DELY21%^2
03970 Xnam = 1.*(Norm% * (DELY21%*DELY31% + DELX21%*DELX31%)\TPABaseSq&)
03980 Ynam = 1.*(Norm% * (DELX21%*DELY31% - DELY21%*DELX31%)\TPABaseSq&)
03990 Quad$=""
04000 IF Xnam>0 AND Ynam>0 THEN Quad$="A"
04010 IF Xnam<0 AND Ynam>0 THEN Quad$="B"
04020 IF Xnam<0 AND Ynam<0 THEN Quad$="C"
04030 IF Xnam>0 AND Ynam<0 THEN Quad$="D"
04040 Xname%=INT(ABS(Xnam)) + 1
04050 Yname%=INT(ABS(Ynam)) + 1
04060 IF Xnam=0 THEN Xname%=0
04070 IF Ynam=0 THEN Yname%=0
04080 Xname% = Xname% * Cell%
04090 Yname% = Yname% * Cell%
04100 IF Xname%>=100 THEN Xname$=" Bad X "
04110 IF Xname%<100 THEN Xname$=MID$(STR$(Xname%),2)
04120 IF Xname%<10 THEN Xname$="0" + MID$(STR$(Xname%),2)
04130 IF Yname%>=100 THEN Yname$=" Bad Y "
04140 IF Yname%<100 THEN Yname$=MID$(STR$(Yname%),2)
04150 IF Yname%<10 THEN Yname$="0" + MID$(STR$(Yname%),2)
04160 FileName$=Quad$+Xname$+Yname$
04170 RETURN
04180 '_____
04190
04200 "SortKGs":                    '    Sorts Keys in KGs by XL
04210 IF ODF%(NOLs%,1,5) + 2 >= ODF%(NOLs%,1,5) + ODF%(NOLs%,1,6)+1 THEN GOTO 4250
04220 FOR K% = ODF%(NOLs%,1,5) + 2 TO ODF%(NOLs%,1,5) + ODF%(NOLs%,1,6)+1
04230 GOSUB "Sort"
04240 NEXT K%
04250 RETURN
04260 '_____
04270
04280 "Sort":                       '    Sorts keys by XL
04290 IF KGs%(NOLs%,K%,1) >= KGs%(NOLs%,K%,2)-1 THEN GOTO 4420
04300 FOR I% = KGs%(NOLs%,K%,1) TO KGs%(NOLs%,K%,2)-1
04310 IF K2% = I% + 1 >= KGs%(NOLs%,K%,2) THEN GOTO 4410
04320 FOR K2% = I% + 1 TO KGs%(NOLs%,K%,2)
04330 IF ODF%(NOLs%,I%,1) <= ODF%(NOLs%,K2%,1)  GOTO "skip"
04340 FOR J% = 1 TO 7:  Temp%(J%) = ODF%(NOLs%,I%,J%):  NEXT J%
04350 FOR J% = 1 TO 5:  Temp2$(J%) = Code$(NOLs%,I%,J%):  NEXT J%
04360 FOR J% = 1 TO 7:  ODF%(NOLs%,I%,J%) = ODF%(NOLs%,K2%,J%):  NEXT J%
04370 FOR J% = 1 TO 5:  Code$(NOLs%,I%,J%) = Code$(NOLs%,K2%,J%):  NEXT J%
04380 FOR J% = 1 TO 7:  ODF%(NOLs%,K2%,J%) = Temp%(J%):  NEXT J%
04390 FOR J% = 1 TO 5:  Code$(NOLs%,K2%,J%) = Temp2$(J%):  NEXT J%
04400 "skip": NEXT K2%
04410 NEXT I%
04420 RETURN
04430 '_____
04440
04450 "Xform":     '   Transforms points from tablet coordinates to ODF coordinates.
04460 Xo%=((Xt%-CC%(iN%,3))*CC%(iN%,1)+(Yt%-CC%(iN%,4))*CC%(iN%,2))\1000.
04470 Yo%=((Yt%-CC%(iN%,4))*CC%(iN%,1)-(Xt%-CC%(iN%,3))*CC%(iN%,2))\1000.
04480 '_____
04490
04500 '     Returns Key, given (Xo,Yo)
04510 "GetKey":
04520 BeginI% = 2                                   '   Search Priority Keys
04530 EndI% = 1 + ODF%(Col%,1,5)
04540 GOSUB "AllSearch"
04550 IF Inout% = 1 THEN GOTO "EndSub3"
04560 BeginI% = I%                                  '   Search Keygroups
04570 EndI% = I% + ODF%(Col%,1,6)-1
04580 GOSUB "AllSearch"
04590 '                                      Search Keygroup Keys
04600 K% = I%
04610 '      If number of keys in group is less than 20, uses sequential search.
04620 IF ODF%(Col%,K%,6)<20 THEN BeginI%=KGs%(Col%,K%,1): EndI%=KGs%(Col%,K%,2): GOSUB
      "AllSearch": GOTO "EndSub3"
```

```
04630 GOSUB "Split"
04640 GOSUB "OrdSearch"
04650 "EndSub3": RETURN
04660 '        _____
04670
04680 "AllSearch":              '     Searches all keys from BeginI% to EndI%
04690 Inout% = 0
04700 FOR I% = BeginI% TO EndI%
04710 IF Xo% <= ODF%(Col%,I%,1) THEN GOTO "NextI"    '  Searches Rectangles in ODF
04720 IF Xo% >= ODF%(Col%,I%,3) THEN GOTO "NextI"    '  (X%, Y%) = Search point
04730 IF Yo% <= ODF%(Col%,I%,2) THEN GOTO "NextI"    '  InOut% = 1 at row I% if found.
04740 IF Yo% >= ODF%(Col%,I%,4) THEN GOTO "NextI"
04750 Inout% = 1: GOTO "EndSub"
04760 "NextI":  NEXT I%
04770 "EndSub": RETURN
04780 '        _____
04790 '
04800 '                          Searches all keys from BeginI% to EndI%
04810 '                          Keys must first be ordered by sorting on XL.
04820 "OrdSearch":
04830 Inout% = 0
04840 FOR I% = KGs%(Col%,K%,1) TO Cut%
04850 IF Xo% >= ODF%(Col%,I%,3) THEN GOTO "NextI2"  '  Searches XL sorted Rectangles in ODF
04860 IF Yo% <= ODF%(Col%,I%,2) THEN GOTO "NextI2"  '  (Xo%, Yo%) = Search point
04870 IF Yo% >= ODF%(Col%,I%,4) THEN GOTO "NextI2"  '  InOut% = 1 at row I% if found.
04880 Inout% = 1: GOTO "EndSub2"
04890 "NextI2": NEXT I%
04900 "EndSub2": RETURN
04910 '        _____
04920
04930 '              This is a simple sequential search
04940 '              Cut% is set to zero if the first row is not a canidate.
04950 "Split":       '    Finds Rows in the sorted array where X% <= to XL
04960 Cut% = 0
04970 FOR I% = KGs%(Col%,K%,1)  TO KGs%(Col%,K%,2)
04980 IF Xo% + .001 > ODF%(Col%,I%,1) THEN GOTO "Loop1"
04990 IF I% > KGs%(Col%,K%,1)  THEN Cut% = I% - 1
05000 GOTO "EndCut"
05010 "Loop1":  NEXT I%
05020 Cut% = KGs%(Col%,K%,2)
05030 "EndCut": RETURN
05040 '        _____
05050
05060 "AddRmv":            '   Adds & Removes ODFs from search table.
05070 '    AdRmv% = 1 to add OLNo% in slot 1 and shift the rest.
05080 '    AdRmv% = 2 to add OLNo% in slot 2 and shift the rest.
05090 '    AdRmv% = 3 to remove OL in slot OLNo% and close gap.
05100 '    NOLs% = Number of OLREMs in memory.
05110 '    NAOLs = Number of active OLREMs in memory.
05120 '    TLNo% = Number given paper OL on tablet.
05130 IF AdRmv% = 1 OR AdRmv% = 2 THEN NAOLs% = NAOLs% + 1: TLNo%=TLNo%+1
05140 IF AdRmv% = 1 OR AdRmv% = 2 AND GotIT%=1 THEN NOLs% = NOLs% + 1
05150 IF AdRmv% = 3 THEN GOTO "Remove"
05160 '                       This adds an overlay to the pointer table.
05170 IF AdRmv% = 1 THEN Start% = 2 ELSE Start% = 3
05180 FOR I5% = NAOLs% TO Start% STEP -1    '    First shift table to make room.
05190 FOR J5% = 1 TO 10: NO%(I5%,J5%) = NO%(I5% - 1,J5%): NEXT J5%
05200 TPAT%(I5%,1,1)=TPAT%(I5%-1,1,1): TPAT%(I5%,1,2)=TPAT%(I5%-1,1,2)
05210 TPAT%(I5%,2,1)=TPAT%(I5%-1,2,1): TPAT%(I5%,2,2)=TPAT%(I5%-1,2,2)
05220 TPAT%(I5%,3,1)=TPAT%(I5%-1,3,1): TPAT%(I5%,3,2)=TPAT%(I5%-1,3,2)
05230 TPAT%(I5%,4,1)=TPAT%(I5%-1,4,1): TPAT%(I5%,4,2)=TPAT%(I5%-1,4,2)
05240 NEXT I5%
05250 IF AdRmv% <> 1 THEN  GOTO "Skip1"
05260 NO%(1,1) = OLNo%                                '  Put new one in slot 1.
05270 NO%(1,2) = TLNo%
05280 FOR J5% = 3 TO 10: NO%(1,J5%) = 0: NEXT J5%
05290 TPAT%(1,1,1)=TPAT%(12,1,1): TPAT%(1,1,2)=TPAT%(12,1,2)
05300 TPAT%(1,2,1)=TPAT%(12,2,1): TPAT%(1,2,2)=TPAT%(12,2,2)
05310 TPAT%(1,3,1)=TPAT%(12,3,1): TPAT%(1,3,2)=TPAT%(12,3,2)
05320 TPAT%(1,4,1)=TPAT%(12,4,1): TPAT%(1,4,2)=TPAT%(12,4,2)
05330 "Skip1":
05340 IF (AdRmv% <> 2) THEN GOTO "EndofSub"
05350 NO%(2,1) = OLNo%                                '  Put new one in slot 2.
```

```
05360 NO%(2,2) = TLNo%
05370 FOR J5% = 3 TO 10: NO%(2,J5%) = 0: NEXT J5%
05380 TPAT%(2,1,1)=TPAT%(12,1,1): TPAT%(2,1,2)=TPAT%(12,1,2)
05390 TPAT%(2,2,1)=TPAT%(12,2,1): TPAT%(2,2,2)=TPAT%(12,2,2)
05400 TPAT%(2,3,1)=TPAT%(12,3,1): TPAT%(2,3,2)=TPAT%(12,3,2)
05410 TPAT%(2,4,1)=TPAT%(12,4,1): TPAT%(2,4,2)=TPAT%(12,4,2)
05420 GOTO "EndofSub"
05430
05440 "Remove":           '    Removes an overlay from the pointer table.
05450 IF ODF%(NO%(OLNo%,1),1,7)>0 THEN NoOfXYs=NoOfXYs%-1
05460 FOR I5% = OLNo% TO NAOLs%
05470 FOR J5% = 1 TO 10: NO%(I5%,J5%) = NO%(I5%+1,J5%): NEXT J5%
05480 TPAT%(I5%,1,1)=TPAT%(I5%+1,1,1): TPAT%(I5%,1,2)=TPAT%(I5%+1,1,2)
05490 TPAT%(I5%,2,1)=TPAT%(I5%+1,2,1): TPAT%(I5%,2,2)=TPAT%(I5%+1,2,2)
05500 TPAT%(I5%,3,1)=TPAT%(I5%+1,3,1): TPAT%(I5%,3,2)=TPAT%(I5%+1,3,2)
05510 TPAT%(I5%,4,1)=TPAT%(I5%+1,4,1): TPAT%(I5%,4,2)=TPAT%(I5%+1,4,2)
05520 NEXT I5%
05530 IF NAOLs% >= 1 THEN NAOLs% = NAOLs% - 1
05540 "EndofSub":
05550 Wind1Point%=0      'This section assigns Window#1 storage handle if XY key is present
05560 IF ODF%(OLNo%,1,7)=0 THEN GOTO 5650
05570 FOR I%=1 TO MaxXYs%
05580 FOR J%=1 TO NAOLs%
05590 IF NO%(J%,9)=I% THEN Wind1Point%=I%
05600 NEXT J%
05610 IF Wind1Point%<I% THEN GOTO 5630
05620 NEXT I%
05630 IF Wind1Point%<MaxXYs% THEN Wind1Point%=Wind1Point%+1
05640 NoOfXYs%=NoOfXYs%+1
05650 NO%(AdRmv%,9)=Wind1Point%
05660 GOSUB "PreCalc"
05670 RETURN
05680 '_____
05690
05700 "Sorry":            '    Puts Sorry message in Window #2.
05710 GOSUB "Boop"
05720 GOSUB "CLRMsg"
05730 GOSUB "CLRCmd"
05740 GET (118,29)-(278,189),Wind%(1)
05750 WINDOW #2
05760 PRINT: PRINT: PRINT
05770 TEXT 6,18,0,0
05780 String$="We're Sorry"
05790 CALL MOVE((WINDOW(2)-FN STRINGWIDTH(String$))/2,0)
05800 PRINT String$: PRINT
05810 TEXT 0,12,0
05820 String$="Delta-Point™ is HERE TO STAY"
05830 CALL MOVE((WINDOW(2)-FN STRINGWIDTH(String$))/2,0)
05840 PRINT String$
05850
05860 DELAY 300: PRINT: PRINT: PRINT
05870 String$="• Conference Communications, Inc. •"
05880 CALL MOVE((WINDOW(2)-FN STRINGWIDTH(String$))/2,0)
05890 PRINT String$
05900
05910 DELAY 1000: PRINT: PRINT: PRINT
05920 String$="Touch Top Triangle to Reset Tablet"
05930 CALL MOVE((WINDOW(2)-FN STRINGWIDTH(String$))/2,0)
05940 PRINT String$;
05950
05960 DELAY 3000: CLS
05970 WINDOW #1
05980 PUT (118,29),Wind%(1)
05990 RETURN
06000 '_____
06010
06020 "PrintMsg"
06030 WindSave%=WINDOW(1)
06040 WINDOW #3: CLS
06050 Adjust%=(WINDOW(2)-FN STRINGWIDTH(Msg$))/2
06060 CALL MOVE(Adjust%,0)
06070 PRINT Msg$;
06080 WINDOW# WindSave%
06090 RETURN
```

```
06100 '_____
06110
06120 "CLRMsg"
06130 WindSave%=WINDOW(1)
06140 WINDOW #3: CLS
06150 WINDOW# WindSave%
06160 RETURN
06170 '_____
06180
06190 "PrintCmd"
06200 WindSave%=WINDOW(1)
06210 WINDOW #4: CLS
06220 Adjust%=(WINDOW(2)-FN STRINGWIDTH(Cmd$))/2
06230 CALL MOVE(Adjust%,0)
06240 PRINT Cmd$;
06250 WINDOW# WindSave%
06260 RETURN
06270 '_____
06280
06290 "CLRCmd"
06300 WindSave%=WINDOW(1)
06310 WINDOW #4: CLS
06320 WINDOW# WindSave%
06330 RETURN
06340 '_____
06350
06360 "PenSiz":
06370 IF PenSize<1 THEN PenSize=1
06380 IF PenSize>25 THEN PenSize=25
06390 PEN PenSize,PenSize
06400 SpotSize=PenSize/2
06410 IF SpotSize<2 THEN SpotSize=2
06420 WhiteSize=SpotSize+1
06430 RETURN
06440 '_____
06450
06460 "PreCalc":
06470 FOR I5%=1 TO NAOLs%
06480 Col% = NO%(I5%,1)
06490 Xsbo%=TPAO%(Col%,2,1)-TPAO%(Col%,1,1)
06500 Ysbo%=TPAO%(Col%,2,2)-TPAO%(Col%,1,2)
06510 BoSq&=Xsbo%^2+Ysbo%^2
06520 Bo%=SQR(BoSq&)
06530 Xsbt%=TPAT%(I5%,2,1)-TPAT%(I5%,1,1)
06540 Ysbt%=TPAT%(I5%,2,2)-TPAT%(I5%,1,2)
06550 BtSq&=Xsbt%^2+Ysbt%^2
06560 Bt%=SQR(BtSq&)
06570 cos& = 1000.*(Xsbt%*Xsbo%+Ysbo%*Ysbt%)\(Bo%*Bt%)
06580 sin& = 1000.*(Ysbt%*Xsbo%-Ysbo%*Xsbt%)\(Bo%*Bt%)
06590 CC%(I5%,1) = cos&*Bo%/Bt%
06600 CC%(I5%,2) = sin&*Bo%/Bt%
06610 h&=TPAT%(I5%,1,1)+(TPAO%(Col%,1,2)*sin&-TPAO%(Col%,1,1)*cos&)*Bt%\(Bo%*1000.)
06620 k&=TPAT%(I5%,1,2)-(TPAO%(Col%,1,1)*sin&+TPAO%(Col%,1,2)*cos&)*Bt%\(Bo%*1000.)
06630 CC%(I5%,3)=h&
06640 CC%(I5%,4)=k&
06650 NEXT I5%
06660 RETURN
06670 '_____
06680
06690 "Rate":
06700 TimeIs&=TIMER
06710 Time%=TimeIs&-TimeWas&
06720 Rate=Points%/Time%
06730 Msg$=STR$(Rate)+" Samples/Sec. after "+STR$(Time%)+" Sec."
06740 GOSUB "PrintMsg"
06750 PRINT#-1, "R0=2":       '    0 = Continuous,  2 = Point mode.
06760 DELAY 1000
06770 RETURN
```

I claim:

1. An overlay driven stored file display system comprising:
   (a) a tablet and stylus means for providing a coordinate signal representative of the coordinates of any of a plurality of points on the tablet selected by the position of said stylus on said tablet;
   (b) storing means for addressably storing a plurality of files each at a unique file address;
   (c) an overlay for random placement on said tablet, said overlay having positioned thereon at least three points having a unique angular relationship defining a file address;
   (d) means responsive to the coordinate signals generated when said stylus is sequentially positioned at each of said three points on said overlay for translating and normalizing the coordinates of the file address of the overlay to an overlay management space such that the file address of said overlay, corresponding to a unique file address of said storing means, causes an access of said storing means to retrieve a stored file; and
   (e) means for displaying the retrieved file.

2. The stored file display system of claim 1 and further comprising:
   at least one additional overlay positionable on said tablet for retrieving additional files for simultaneous display.

3. The stored file display system of claim 1 and further comprising:
   means for translating and normalizing any points on said overlay that are selected by the positioning of the stylus on the overlay to generate coordinate signals corresponding to the address of information associated with the retrieved file.

4. The stored file display system of claim 1 wherein a point on said overlay corresponds to a unit cell.

5. A display system comprising:
   a tablet and probe of the type that provides a coordinate signal representative of the coordinates of points on the tablet in response to the position of said probe with respect to said tablet;
   a storage means for addressably storing a plurality of files each at a unique address corresponding to the coordinates of uniquely angularly related apex points of a randomly positionable triangle shape on said tablet;
   an overlay for random placement on said tablet said overlay having positioned thereon a plurality of uniquely angularly related points corresponding to the address of a stored file;
   means coupled to said tablet and said storage means and responsive to at least three sequential coordinate signals representing the apex points of a triangle for providing a unique address signal to said storage means so as to access an associated stored file; and
   display means coupled to said storage means for displaying the accessed file.

6. A display system comprising:
   an X, Y position sensing tablet including a tablet stylus for providing position signals indicative of the position of the tablet stylus on the surface of the sensing tablet;
   a storage means for addressably storing a plurality of files each at a file address corresponding t a particular position signal;
   an overlay for random placement on said tablet, said overlay having at least three points thereon having a unique angular relationship corresponding to a stored file address, and whereon the distance between two of the points corresponds to a scale factor and whereon the position of two of the points defines a reference axis;
   means responsive to the position signals, generated when the stylus is sequentially positioned at each of the three points for transforming and normalizing each point by the scale factor such that a stored file is accessed from storage means; and display means coupled to said storage means for displaying the accessed file.

7. A stored file display system comprising:
   a digitizer tablet means including a stylus for providing a coordinate signal representative of the position of the stylus on a surface of the tablet;
   a computer means including means for storing addressable files by the angular relationship of sets of coordinate signals from said digitizer tablet;
   an overlay for random placement on said tablet said overlay having positioned thereon a plurality of uniquely angularly related points corresponding to the address of a stored file; and
   display means coupled to said computer means for visually displaying stored files selected by the sets of coordinate signals from said digitizer tablet.

8. A stored file display system according to claim 7 wherein the angular relationship of said sets of coordinate signals determines a unique file address having a first point which is a base point, a second point which is a scale point and a third point which is a file point.

9. The stored file display system according to claim 8 wherein said computer means addresses a file by coordinate transformation of the first, second and third points to a file related coordinate system; and
   by scaling the transformed position of the third point to derive a file point having coordinates corresponding to the address of the selected file.

10. The stored file display system according to claim 9 and further comprising:
    at least one control overlay randomly positionable on the surface of the digitizer tablet means, said control overlay containing labeled control functions and indicia of the angular relationship of said first, second and third points such that positioning the stylus at the first, second and third points on the overlay accesses a menu directing file and further positioning of the stylus at any of the labeled control functions activates a stored control function.

11. The stored file display system according to claim 10 and further comprising:
    a control overlay affixed to the surface of said digitizer tablet means for providing coordinate signals when activated by said stylus for providing the functions of ADD, DELETE and RESET when multiple overlays are used with said tablet.

12. A method for accessing stored files from a addressable store coupled to a tablet of the type that provides a coordinate signal representative of the position of a stylus on a surface of the tablet with respect to tablet coordinate axes comprising the steps of:
    (a) randomly placing an overlay on a surface of the tablet, said overlay having three triangularly positioned points with a unique angular relationship corresponding to address scale factor and base points of a desired stored file;

(b) positioning the stylus on said overlay at each of said three triangularly positioned points to generate three coordinate signals;

(c) transforming the three coordinate signals such that the overlay base point is aligned with respect to an ODF artwork axis;

(d) scaling the transformed three coordinate signals such that the address point coordinate signal of the overlay corresponds to the address of a stored file independent of the positioning and size of the overlay on the surface of the tablet; and (e) accessing the stored file with the address point coordinate signal.

13. The method according to claim 12 wherein steps (a) through (e) are repeated for each additional overlay placed on the surface of the tablet for the purpose of addressing a plurality of stored files.

14. The method according to claim 12 and further comprising the step of:

(f) displaying the file accessed in step (e) to permit operator interaction.

15. The method according to claim 12 and further comprising the steps of:

(f) placing a control overlay, having a plurality of control functions displayed thereon and a plurality of points having a unique angular relationship corresponding to a stored file, on a surface of said tablet; and (g) positioning the stylus on the control overlay at the plurality of points and the desired control function when needed.

16. The method according to claim 12 and further comprising the step of:

incrementally increasing a limited number of times the number of points around a transformed and scaled overlay address point if an address of a stored file is not found so as to provide for inaccuracy of positioning the stylus on the overlay.

17. A method for accessing a stored file and associated stored data from a addressable store coupled to a tablet of the type that provides a coordinate signal representative of the position of a stylus on a surface of the tablet with respect to tablet coordinate axes comprising the steps of:

(a) randomly placing an overlay on a surface of the tablet, said overlay having three triangularly positioned points having a unique angular relationship corresponding to stored file address, scale factor and base points;

(b) positioning the stylus on said overlay at each of said three triangularly positioned points to generate three coordinate signals;

(c) transforming the three coordinate signals such that the overlay base point is aligned with respect to an ODF artword axis;

(d) scaling the transformed three coordinate signals such that the address point's associated coordinate signal corresponds to the address of a stored file independent of the positioning and size of the overlay on the surface of the tablet;

(e) accessing the stored file with the address point's coordinate signal;

(f) positioning the stylus on said overlay at a point corresponding to the stored file data desired to be displayed to generate a data coordinate signal;

(g) transforming and scaling the data coordinate signal such that the data coordinate signal corresponds to the address of the stored file data independent of the positioning and size of the overlay on the surface of the tablet;

(h) accessing the stored file data with the transformed and scaled data coordinate signal;

(i) displaying the accessed stored file data accessed in step h); and (j) repeating steps (b) through (i) to form a display of accessed stored file data.

18. The method of claim 17 wherein step (a) places a plurality of overlays on the surface of the tablet, and further comprising the step of;

(k) repeating steps (b) through (j) to form a composite display of accessed stored file data.

19. The method of claim 18 and further comprising the steps of:

(l) placing a control overlay, having a plurality of control functions and a plurality of unique angularly positioned points corresponding to a stored control file displayed thereon, on a surface of said tablet; and (m) positioning the stylus on the control overlay at the plurality of points and the desired control functions when needed.

20. An overlay driven stored file display comprising:

(a) a tablet and stylus means for providing coordinate signals representative of the coordinates of any of a plurality of points on the tablet selected by the position of said stylus on said tablet;

(b) storing means for addressably storing a plurality of files each at a unique file address related tot he coordinates of a corresponding one of the plurality of points on said tablet;

(c) an overlay for random placement on said tablet, said overlay having at lease four points thereon with a unique angular relationship corresponding to a unique file address, three of said points positioned to define a standard figure and whereon the position of one point corresponds to a file point address and where the distance between two of the points corresponds to a scale factor and whereon the positions of two of the points define a base line;

(d) computer means responsive to the coordinate signals generated when said stylus is positioned at each of the four points of said overlay for correcting the position of the three of said four points to the defined standard figure utilizing the unique angular relationship of a fourth point with respect to the three points defining the standard figure if the standard figure of said overlay is distorted, said computer means also translating and scaling the coordinates of the file point address of the overlay to an overlay management space such that the file point address of said overlay, corresponding to the unique file address causes an access of said storing means to retrieve a stored file; and (e) display means coupled to said storing means for displaying the retrieved file.

21. A method for accessing stored files from an addressable store coupled to a tablet of the type that provides a coordinate signal representative of the position of a stylus on a surface of the tablet comprising the steps of:

(a) randomly placing an overlay on a surface of the tablet, said overlay having three or more points with a unique angular relationship corresponding to the address of a stored file;

(b) positioning the stylus on said overlay at each of the three or more points to generate coordinate signals; and (c) accessing the stored file with the generated coordinate signals.

* * * * *